(12) United States Patent
Tuzel et al.

(10) Patent No.: US 9,704,257 B1
(45) Date of Patent: Jul. 11, 2017

(54) SYSTEM AND METHOD FOR SEMANTIC SEGMENTATION USING GAUSSIAN RANDOM FIELD NETWORK

(71) Applicant: Mitsubishi Electric Research Laboratories, Inc., Cambridge, MA (US)

(72) Inventors: Oncel Tuzel, Winchester, MA (US); Raviteja Vemulapalli, Hyattsville, MD (US); Ming-Yu Liu, Revere, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/081,337

(22) Filed: Mar. 25, 2016

(51) Int. Cl.
| | |
|---|---|
| *G06K 9/00* | (2006.01) |
| *G06T 7/00* | (2017.01) |
| *G06N 3/04* | (2006.01) |
| *G06N 3/08* | (2006.01) |
| *G06N 7/00* | (2006.01) |

(52) U.S. Cl.
CPC ............ *G06T 7/0081* (2013.01); *G06N 3/04* (2013.01); *G06N 3/08* (2013.01); *G06N 7/005* (2013.01); *G06T 2207/10004* (2013.01); *G06T 2207/20084* (2013.01)

(58) Field of Classification Search
CPC ........ G06K 7/1482; G06N 3/02; G06N 7/046; G06T 3/4046; G06T 9/002; G06T 2207/20084; H03H 2017/0208; H03H 2222/04
See application file for complete search history.

(56) References Cited

U.S. PATENT DOCUMENTS

| | | | | |
|---|---|---|---|---|
| 5,830,141 | A * | 11/1998 | Makram-Ebeid | G06T 7/0012 382/128 |
| 7,729,537 | B2 * | 6/2010 | Grady | G06K 9/03 382/173 |
| 8,467,599 | B2 * | 6/2013 | El Dokor | G06K 9/00221 382/156 |
| 2015/0215590 | A1* | 7/2015 | Nowozin | G06T 3/4015 348/242 |

OTHER PUBLICATIONS

Zheng et al. "Conditional Random Fields as Recurrent Neural Networks." The IEEE International Conference on computer Vision (ICCV), 2015, pp. 1529-1537.

* cited by examiner

*Primary Examiner* — Duy M Dang
(74) *Attorney, Agent, or Firm* — Gene Vinokur; James McAleenan; Hironori Tsukamoto

(57) ABSTRACT

A computer-implemented method for semantic segmentation of an image determines unary energy of each pixel in an image using a first subnetwork, determines pairwise energy of at least some pairs of pixels of the image using a second subnetwork, and determines, using a third subnetwork, an inference on a Gaussian random field (GRF) minimizing an energy function including a combination of the unary energy and the pairwise energy. The GRF inference defining probabilities of semantic labels for each pixel in the image, and the method converts the image into a semantically segmented image by assigning to a pixel in the semantically segmented image a semantic label having the highest probability for a corresponding pixel in the image among the probabilities determined by the third subnetwork. The first subnetwork, the second subnetwork, and the third subnetwork are parts of a neural network.

20 Claims, 12 Drawing Sheets

FIG. 3B

SYSTEM AND METHOD FOR SEMANTIC SEGMENTATION USING GAUSSIAN RANDOM FIELD NETWORK

FIELD OF THE INVENTION

This invention relates generally to computer vision and machine learning and more particularly to labeling images semantically.

BACKGROUND OF THE INVENTION

Semantic segmentation, which aims to predict a category label for every pixel in the image, is an important task for scene understanding. It is a challenging problem due to large variations in the visual appearance of the semantic classes and complex interactions between various classes in the visual world. Recently, convolutional neural networks (CNNs) have been shown to work well for this challenging task. However, convolutional neural networks may not be optimal for structured prediction tasks such as semantic segmentation as they do not model the interactions between output variables directly.

Various semantic segmentation methods use a discrete conditional random field (CRF) on top of CNNs. By combining CNNs and CRFs, these methods provide the ability of CNNs to model complex input-output relationships and the ability of CRFs to directly model the interactions between output variables. Majority of these methods use CRF as a separate post-processing step. Usually, a CNN processes the image to produce unary energy, which in turn processed by CRF to label the image. However, CRF has different principles of operations than CNN. That disconnects CNN from CRF and prevents their join training In general, CRF is either manually tuned or separately trained from CNNs.

One method, instead of using CRF as a post-processing step, trains a CNN together with a discrete CRF by converting the inference procedure of the discrete CRF into a recurrent neural network. However, in general, the inferences on discrete CRFs are intractable due to discrete and non-differentiable nature of the CRF formulation. To that end, that method uses approximate inference procedures that does not have global optimum guarantees and can lead to poor training result.

SUMMARY OF THE INVENTION

Some embodiments of the invention are based on recognition that it is advantageous to provide semantic segmentation of an image using a combination of convolutional neural networks (CNNs) and a discrete conditional random field (CRF). However, some embodiments are based on additional recognition that it is advantageous to substitute in this combination the CRF with a neural network (NN). Such a substitution can connect various sub networks participating into the semantic segmentation into a common neural network that can be jointly trained. However, it is difficult to emulate operations of CRF with NN due to discrete and non-differentiable nature of the CRF formulation.

Some embodiments are based on realization that CRF can be first replaced with Gaussian random field (GRF), which is a subclass of the CRF. Operations of GRF inference are continuous and differentiable, and can be solved optimally. Despite the fact that image segmentation is a discrete task, GRF is still suitable for the semantic segmentation.

Some embodiments are based on a realization that it is possible to emulate operations of GRF inference with a neural network. Because both neuron operations and GRF operations are continuous and differentiable, the continuity of operations of GRF allows replacing each algebraic operation in the GRF with some neuron operation. These neuron operations are applied sequentially as those algebraic operations applied during the GRF inference.

To that end, the embodiments produce a first subnetwork for determining unary energy, the second subnetwork for determining pairwise energy, a third subnetwork for emulating GRF inference and train all three subnetworks jointly.

Accordingly, one embodiment of the invention discloses a computer-implemented method for semantic segmentation of an image. The method includes determining unary energy of each pixel in an image using a first subnetwork; determining pairwise energy of at least some pairs of pixels of the image using a second subnetwork; determining, using a third subnetwork, an inference on a Gaussian random field (GRF) minimizing an energy function including a combination of the unary energy and the pairwise energy to produce a GRF inference defining probabilities of semantic labels for each pixel in the image; and converting the image into a semantically segmented image by assigning to a pixel in the semantically segmented image a semantic label having the highest probability for a corresponding pixel in the image among the probabilities determined by the third subnetwork, wherein the first subnetwork, the second subnetwork, and the third subnetwork are parts of a neural network. The steps of the method are performed by a processor.

Yet another embodiment discloses a system for semantic segmentation of an image including at least one non-transitory computer readable memory to store the image and a semantically segmented image; and a processor to perform a semantic segmentation of the image using a Gaussian random field (GRF) network to produce the semantically segmented image, wherein the GRF network is a neural network including a first subnetwork for determining a unary energy of each pixel in an image; a second subnetwork for determining pairwise energy of at least some pairs of pixels of the image; and a third subnetwork for determining an inference on a Gaussian random field (GRF) minimizing an energy function including a combination of the unary energy and the pairwise energy to produce a GRF inference defining probabilities of semantic labels for each pixel in the image; wherein the processor converts the image into a semantically segmented image by assigning to a pixel in the semantically segmented image a semantic label having the highest probability for a corresponding pixel in the image among the probabilities determined by the third subnetwork.

Yet another embodiment discloses a non-transitory computer-readable medium with instructions stored thereon, that when executed by a processor, perform the steps including determining unary energy of each pixel in an image using a first subnetwork; determining pairwise energy of at least some pairs of pixels of the image using a second subnetwork; determining, using a third subnetwork, an inference on a Gaussian random field (GRF) minimizing an energy function including a combination of the unary energy and the pairwise energy to produce a GRF inference defining probabilities of semantic labels for each pixel in the image; and converting the image into a semantically segmented image by assigning to a pixel in the semantically segmented image a semantic label having the highest probability for a corresponding pixel in the image among the probabilities determined by the third subnetwork, wherein the first subnetwork, the second subnetwork, and the third subnetwork are jointly trained as parts of a neural network.

BRIEF DESCRIPTION OF THE DRAWINGS

FIG. 3B is a pseudo code for implementation of the GRF network according to one embodiment of the invention;

DETAILED DESCRIPTION OF THE PREFERRED EMBODIMENT

Figure 1A:
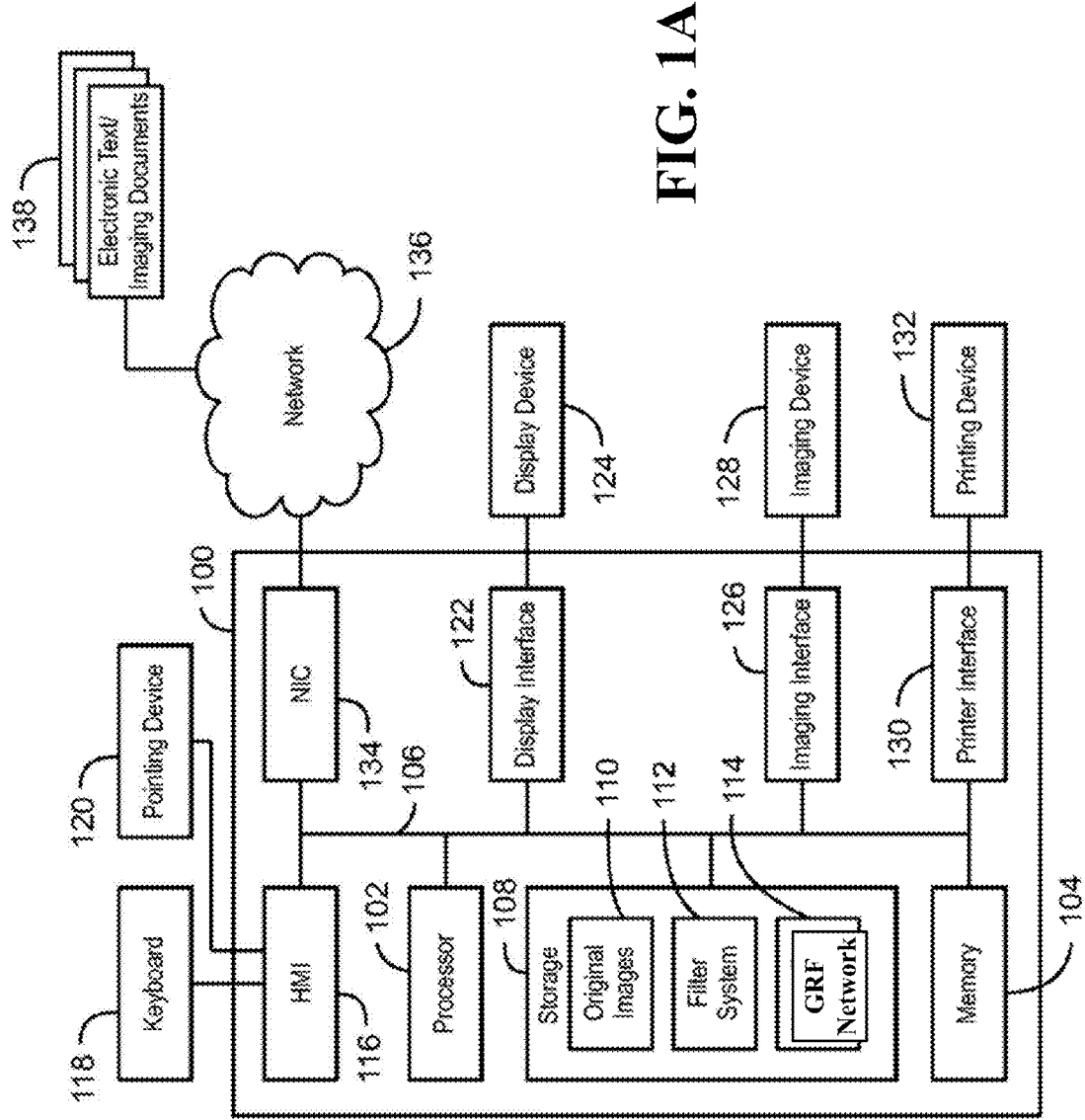
FIG. 1A is a block diagram of a computer system for semantic segmentation of an image in accordance with some embodiments of the invention.

FIG. 1A shows a block diagram of a computer system 100 for semantic segmentation of an image in accordance with some embodiments of the invention. The computer system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

Figure 1B:
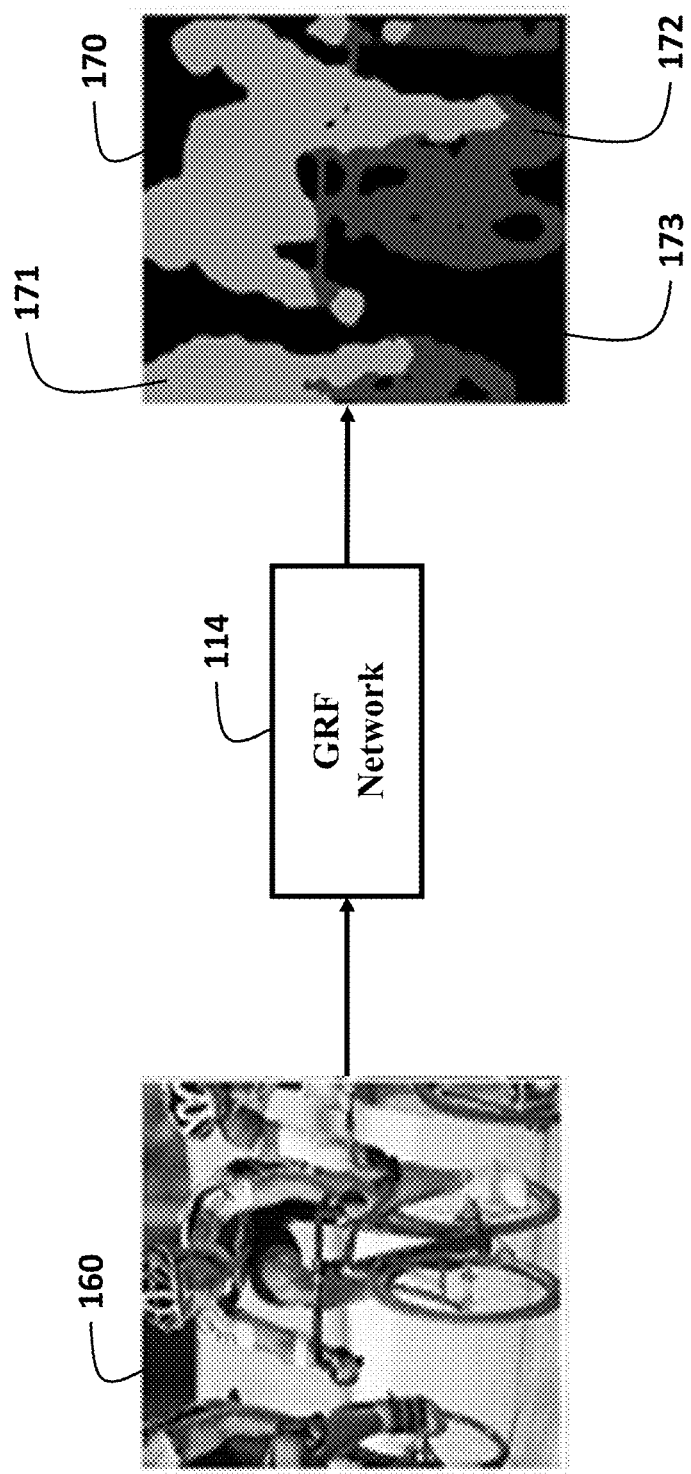
FIG. 1B is a schematic of a semantic segmentation via image labeling using Gaussian random field (GRF) neural network in accordance with some embodiments of the invention.

FIG. 1B shows a schematic of a semantic segmentation via image labeling using Gaussian random field (GRF) neural network in accordance with some embodiments of the invention. The semantic segmentation can be performed by the processor 102 executing the instruction stored in the memory 104. The GRF network 114 performs a semantic labeling of the image 160 to produce a segmented image 170 having pixels labeled with semantic classes, e.g., using the semantic labels 171, 172, and 173. The GRF network 114 is a neural network and at least some operations of the GRF network 114 emulate operations of a GRF inference.

GRF is a random field involving Gaussian distribution and/or Gaussian probability density functions of the variables. A one-dimensional GRF is also called a Gaussian process. For example, the GRF network 114 models a probability density of possible semantic labels 171, 172, and 173 conditioned on a value of each pixel of the image 160 as a Gaussian distribution of an energy function including the unary energy and the pairwise energy and performs a Gaussian inference on the energy function to determining probabilities of each semantic labels for each pixel of the image.

In general, Gaussian inference refers to determining a property (for example mean or covariance) of an underlying Gaussian distribution. In this case, the Gaussian distribution is formed by statistical variables defining the probabilities of the pixels of the image to belong to different semantic classes. To that end, the unary and the pairwise energy are functions of probabilities of the semantic labels of the pixels. For example, in some embodiments, the Gaussian inference determines a mean of the Gaussian distribution defined using the unary and the pairwise energy Some embodiments are based on realization that CRF can be first replaced with the GRF, which is a subclass of the CRF. Operations of GRF inference are continuous and differentiable, and can be solved optimally. Despite the fact that semantic segmentation of an image is a discrete task, GRF is still suitable for the semantic segmentation.

The computer system 100 can also include a storage device 108 adapted to store the original images 110, a filter 112 for filtering the original image to produce the image 160 suitable for the segmentation. For example, the filter can resized and align the original image with the images of the training data. The storage device 108 can also store the structure and parameters of the GRF network 114. In various embodiments, the GRF network 114 is trained on a set of training images and a corresponding set of training semantic labels.

The storage device 108 can include a hard drive, an optical drive, a thumbdrive, an array of drives, or any combinations thereof. A human machine interface 116 within the computer system 100 can connect the system to a keyboard 118 and pointing device 120, wherein the pointing device 120 can include a mouse, trackball, touchpad, joy stick, pointing stick, stylus, or touchscreen, among others. The computer system 100 can be linked through the bus 106 to a display interface 122 adapted to connect the system 100 to a display device 124, wherein the display device 124 can include a computer monitor, camera, television, projector, or mobile device, among others.

The computer system 100 can also be connected to an imaging interface 126 adapted to connect the system to an imaging device 128. In one embodiment, the image for semantic segmentation is received from the imaging device. The imaging device 128 can include a camera, computer, scanner, mobile device, webcam, or any combination thereof. A printer interface 130 can also be connected to the computer system 100 through the bus 106 and adapted to connect the computer system 100 to a printing device 132, wherein the printing device 132 can include a liquid inkjet printer, solid ink printer, large-scale commercial printer, thermal printer, UV printer, or dye-sublimation printer, among others. A network interface controller 134 is adapted to connect the computer system 100 through the bus 106 to a network 136. Through the network 136, the images 138 including one or combination of the electronic text and imaging input documents can be downloaded and stored within the computer's storage system 108 for storage and/or further processing.

To facilitate the description, this disclosure uses bold face small letters to denote vectors and bold face capital letters to denote matrices. $A^T$ and $A^{-1}$ denote the transpose and inverse of a matrix A. Notion $\|b\|_2^2$ to denote the squared $l_2$ norm of a vector b. A≥0 means that A is symmetric and positive semidefinite matrix.

The neural networks are a family of models inspired by biological neural networks and are used to estimate or approximate functions that can depend on a large number of inputs and are generally unknown. The neural networks are generally presented as systems of interconnected nodes or "neurons" that exchange messages between each other. Each node is associated with a function for transforming the message. This function is usually non-linear to form a non-linear part of message transformation. Each connection between the nodes is associated with a numeric weight for scaling of the messages to form a linear part of message transformation. Typically, the functions are fixed and predetermined for all nodes, e.g., selected by a designer of the neural network. Examples of the functions typically selected for the nodes include the sigmoid and rectifier functions. In contrast, the numeric weights are different and tuned based on training data, making the neural network adaptive to inputs and capable of learning.

Some embodiments are based on a realization that it is possible to emulate operations of GRF inference with a neural network. Because both neuron operations and GRF operations are continuous and differentiable, the continuity of operations of GRF allows replacing each algebraic operation in the GRF with some neuron operation. These neuron operations are applied sequentially as those algebraic operations applied during the GRF inference.

The semantic segmentation assigns each pixel in an image X 160 to one of the K possible classes in the image 170. Such an assignment is referred herein as the semantic labeling. After the semantic labeling is performed, the results of the semantic labeling of the pixels produce semantic segmentation of an image. Some embodiments use K variables (one for each class) to model the output at each pixel, and the final label assignment is done based on which of these K variables has the maximum value, e.g., a value of probability. Let $y_i=[y_{i1}, y_{iK}]$ be the vector of K output variables associated with the $i^{th}$ pixel, and y be the vector of all output variables. For example, the conditional probability density P(y|X) can be modeled as a Gaussian distribution given by $$P(y|X) \propto \exp\{-\tfrac{1}{2}E(y|X)\}, \text{ where}$$

$$E(y|X)=\Sigma_i\|y_i-r_i(X;\theta_u)\|_2^2+\Sigma_{ij}(y_i-y_j)^T W_{ij}(X;\theta_p)(y_i-y_j). \quad (1)$$

The first term in the above energy function E is the unary term representing unary energy and the second term is the pairwise term representing a pairwise energy. Here, both the unary energy parameter $r_i$ for each pixel i and the pairwise energy parameter $W_{ij\neq 0}$ between a first pixel i and a second pixel j are computed using functions of the input image X with $\theta_u$ and $\theta_p$ being the respective function parameters. In the embodiment having $W_{ij}\neq 0$ for all pairs of pixels, the unary and pairwise terms can be combined together into a single positive semidefinite quadratic form.

Figure 1C:
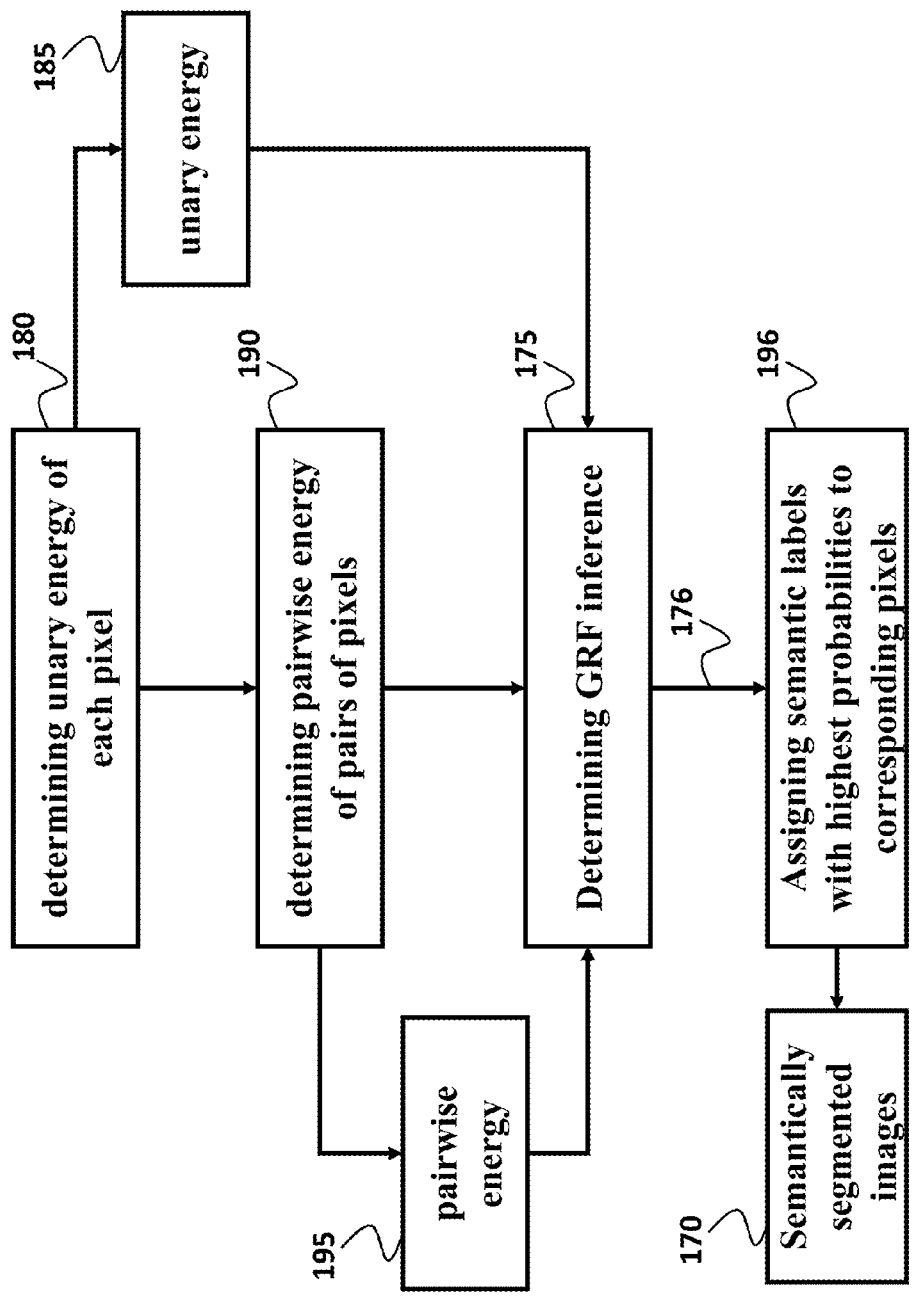
FIG. 1C is a block diagram of a computer-implemented method for semantic labeling of an image according to one embodiment of the invention.

FIG. 1C shows a block diagram of a method for semantic labeling of an image according to one embodiment of the invention. The method can be performed by the GRF network 114 executed by the processor 102. The method determines 180 unary energy 185 for each pixel in the image and determines 190 pairwise energy 195 for at least some pairs of pixels of the image. Next, the method determines 175 the GRF inference 176 of the image by processing the unary energy 185 and the pairwise energy 195. For example, in some embodiments, the GRF inference is determined by minimizing an energy function including a combination of the unary energy and the pairwise energy.

In various embodiments, the unary energy 185 is determined 180 using a first subnetwork, the pairwise energy 195 is determined 190 using a second subnetwork, and the GRF inference 176 is determines 175 using a third subnetwork, wherein the first subnetwork, the second subnetwork, and the third subnetwork are parts of a neural network. In such a manner, all parameters of the neural network can be jointly trained.

The GRF inference defines probabilities of semantic labels for each pixel in the image. For example, in some embodiments of the invention, the unary energy 185 is a first function of probabilities of the semantic labels of the pixels determined using the first subnetwork and the pairwise energy 195 is a second function of the probabilities of the semantic labels of the pixels determined using the second subnetwork. To that end, the method converts the image 160 into a semantically segmented image 170 by assigning 196 to a pixel in the semantically segmented image 170 a semantic label having the highest probability for a corresponding pixel in the image 160 among the probabilities determined by the third subnetwork, wherein the first subnetwork, and the second subnetwork.

The optimal semantic labels y that minimizes the energy function E can be obtained in closed form since the minimization of E is an unconstrained quadratic program. However, this closed form solution involves solving a linear system with number of variables equal to the number of pixels times the number of classes. Some embodiment based on recognition that solving such a large linear system can be computationally prohibitive. In those embodiments, the third subnetwork determines GRF inference by emulating an operation of a Gaussian mean field (GMI) inference.

Figure 2A:
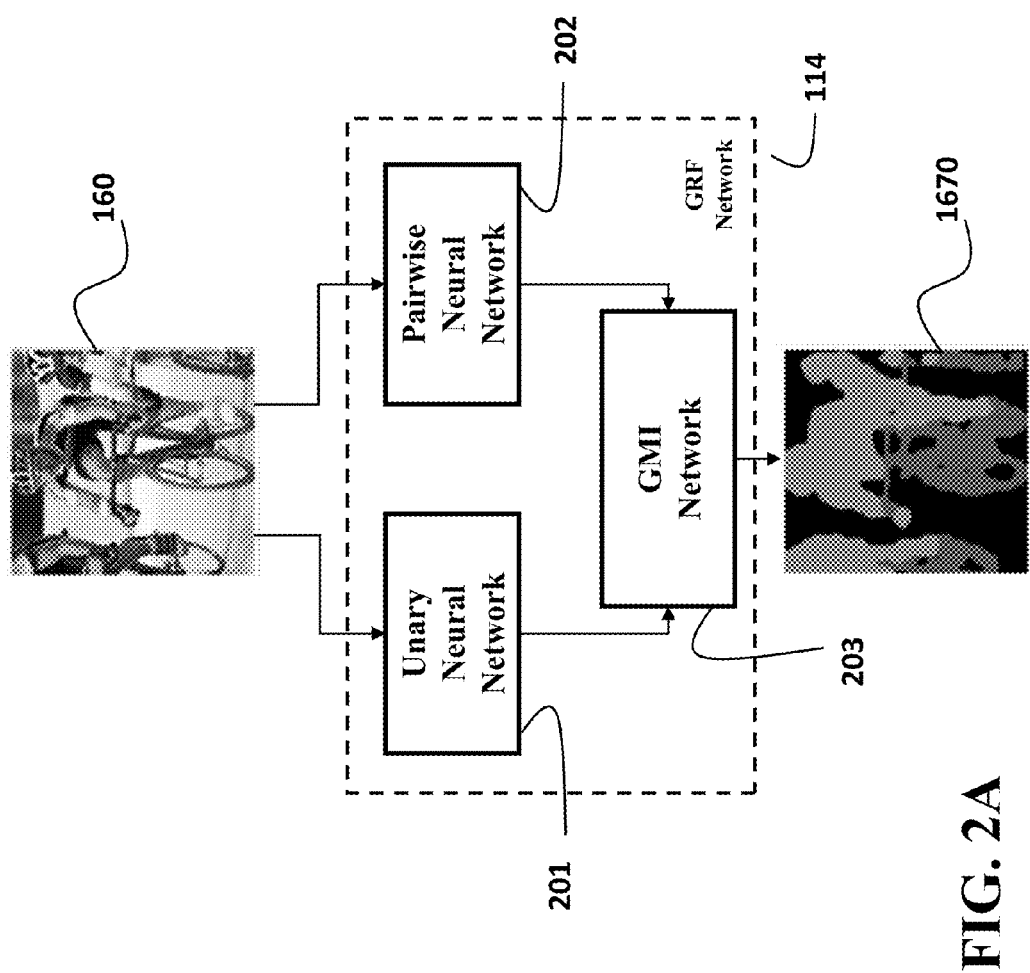
FIG. 2A is a block diagram of a GRF network according to one embodiment of the invention.

FIG. 2A shows a block diagram of a GRF network according to one embodiment of the invention. In this embodiment, the GRF network includes three subnetworks, i.e., the first subnetwork trained as a unary network 201 for determining the unary energy 185, the second subnetwork trained as a pairwise network 202 for determining the pairwise energy 195 and the third subnetwork is a GMI network 203 for determining a mean field inference update to minimize the energy function. While the unary and pairwise networks generate parameters $r_1$ and $W_{ij}$ that are respectively used in the unary and pairwise terms of the energy function Equation (1), the GMI network performs Gaussian mean field inference using the outputs of unary and pairwise networks.

In one embodiment, the mean field updates for computing the mean μ are given by $$\mu_i \leftarrow (I+\Sigma_j W_{ij})^{-1}(r_i+\Sigma_j W_{ij}\mu_j) \quad (2)$$

where the updates are performed sequentially for each pixel i. The energy function is a convex quadratic in the case of GRF and update of Equation (2) solves each sub-problem optimally, i.e., finds the optimal $y_i$ (or $\mu_i$) when all the other $y_j$ (or $\mu_j$) are fixed. To that end, performing serial updates is guaranteed to give the maximum a posteriori(MAP) solution.

Figure 2B:
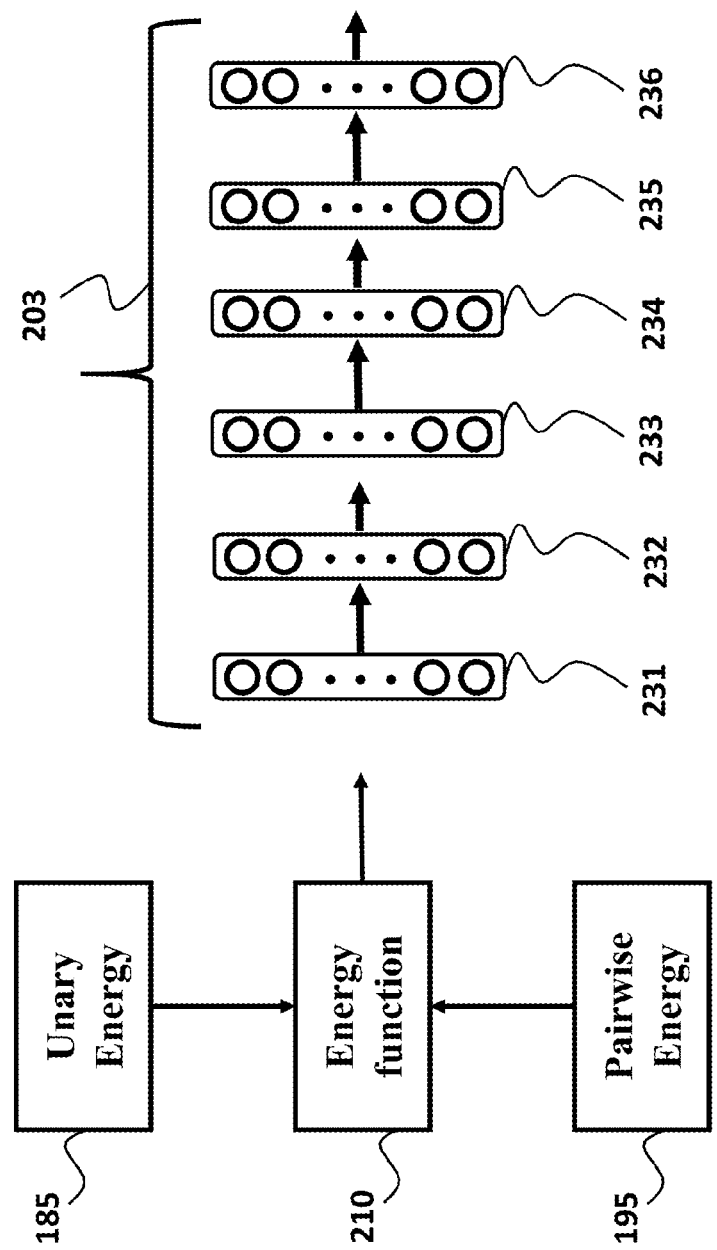
FIG. 2B is a schematic of the minimization of the energy function according to some embodiments of the invention.

FIG. 2B shows a schematic of the minimization of the energy function with NN according to some embodiments of the invention. The energy function 210 includes a combination of the unary energy 185 and the pairwise energy 195. An example of the energy function is the function of Equation (1). Each layer 231, 232, 233, 234, 235, and 236 of the third subnetwork 203 recursively determines a mean field inference update to minimize the energy function 210.

Example of the recursive minimization is provided in Equation (2). The number of layers in the subnetwork 203 can be selected based on the number of desired iterations of the update.

Figure 3A:
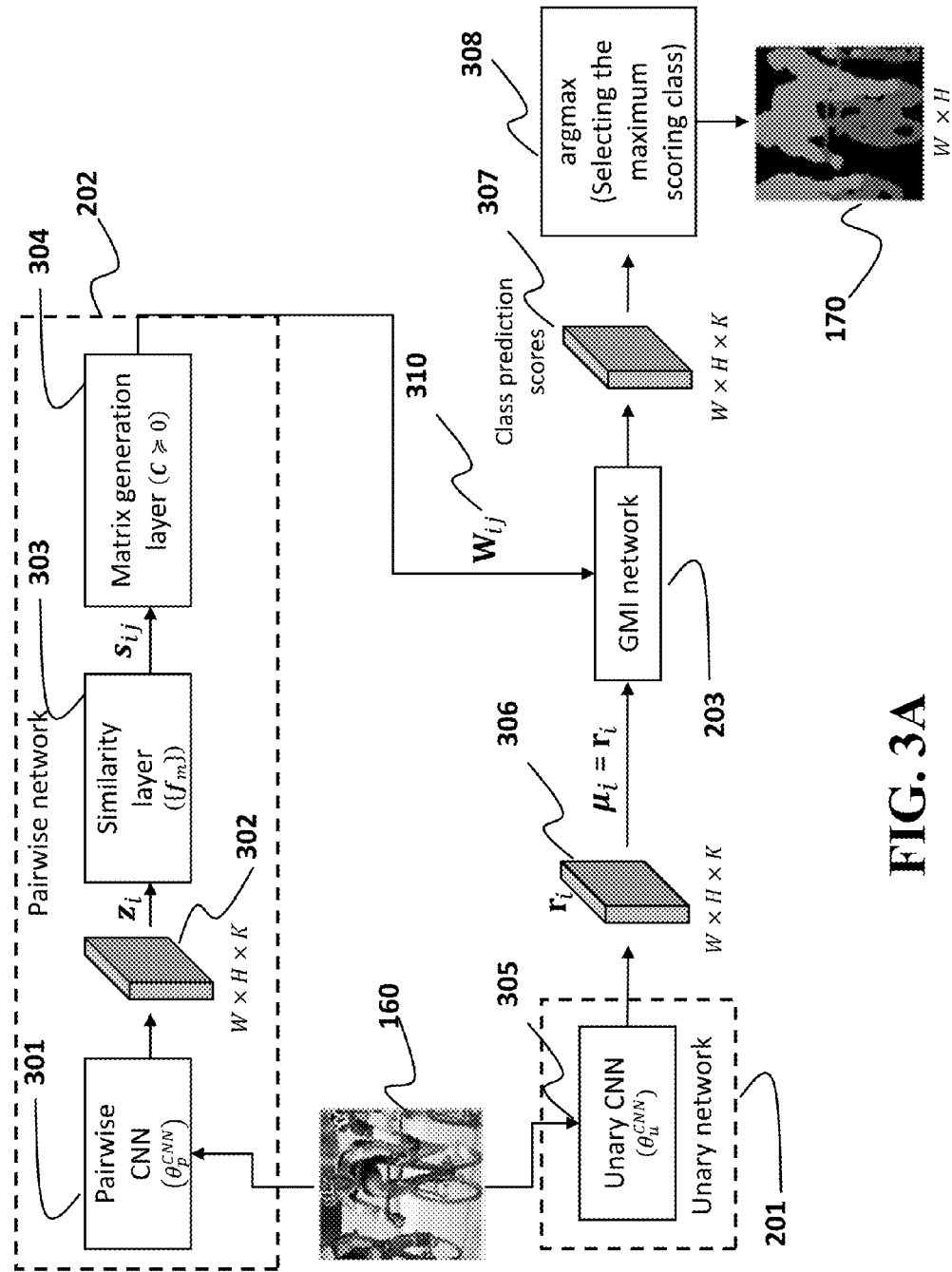
FIG. 3A is a block diagram of the GRF network according to one embodiment of the invention.

FIG. 3A shows a block diagram of the GRF network according to one embodiment of the invention. In this embodiment, the first subnetwork 201 is a convolutional NN (CNN) referred herein as a unary CNN 305 with parameters $\theta_u^{CNN}$. The unary CNN, for each pixel of the image 160, receives as an input a subset of pixels neighboring the pixel and producing probabilities of the pixel belonging to each possible semantic label. For example, the subset of pixels can be the pixels of a rectangular patch centered on the pixel.

In this embodiment, the unary energy parameter $r_i$ 306 is computed using a function of a subset of pixels neighboring the pixel and is used in the unary term of the energy function of Equation (1). For example, the unary energy function is a quadratic function II $y_i - r_i(X; \theta_u)\|_2^2$, wherein $r_i$ is the unary energy parameters which is computed through the unary CNN, $\theta_u$ is parameters of the linear filters, y is the probabilities of the semantic labels, i is an index of the pixel. The unary CNN applies a series of linear filters performing convolutional operation inputs to each layer and applies, at least at some layers, a non-linear function for outputs of each linear filter.

For example, in one implementation, the unary CNN 305 is a modified version of a Oxford Visual Geometry Group (VGG-16) network. Modifications compared to VGG-16 include converting the fully-connected layers into convolutional layers, skipping downsampling layers, modifying the convolutional layers after, e.g., a fourth pooling layer, to compensate for the loss in the field-of-view because of skipping downsampling, and using multi-scale features.

The second subnetwork, (or pairwise network) 202 includes a pairwise CNN 301 with parameters $\theta_p^{CNN}$ for determining matrices $W_{ij}$ 310 that are used in the pairwise term of the energy function of Equation (1). For example, the pairwise network 202 determines a similarity measure between the pixels of the pair using the pairwise CNN 301, determines a covariance matrix based on the similarity measure, and determines the pairwise energy as a function of the covariance matrix.

For example, the pairwise network 202 processes 302 a first subset of pixels neighboring a first pixel i of the pair to produce features $z_i$ of the first pixel and processes 302 a second subset of pixels neighboring a second pixel j of the pair to produce features $z_j$ of the second pixel. The pairwise network 202 determines 303 a function of a difference between the first and the second features to produce the similarity measure $s_{ij}$, and determines 304 the pairwise energy as covariance matrix $W_{ij}$ according to $$W_{ij} = s_{ij}C, C \geq 0, \quad (3)$$

where $s_{ij} \in [0,1]$ is a measure of similarity between pixels i and j, and the learned matrix C encodes the class compatibility information. The similarity measure $s_{ij}$ can be determined 303 according to $$s_{ij} = e^{-(z_i-z_j)^T F(z_i-z_j)} \quad (4)$$

where $z_i$ (302) is the feature vector extracted at $i^{th}$ pixel using the pairwise CNN 301 and the learned matrix $F \geq 0$ defines a distance function, e.g., a Mahalanobis distance function.

The structure of the pairwise CNN can be same as the unary CNN. In some embodiments, the exponent of $S_{ij}$ is $$(z_i-z_j)^T F(z_i-z_j) = \sum_{m=1}^M (f_m^T z_i - f_m^T z_j)^2, \quad (5)$$

where $F = \sum_{m=1}^M f_m f_m^T$. In this embodiment, the Mahalanobis distance computation is implemented as convolutions of $z_i$ with filters $f_m$ followed by an Euclidean distance computation.

In one embodiment, the pairwise network 202 includes a pairwise CNN that generates the pixel features $z_i$, a similarity layer 303 that computes $s_{ij}$ for every pair of connected pixels using Equations (4) and/or (5), and a matrix generation layer 304 that computes the matrices $W_{ij}$ using Equation (3). In this embodiment, $\{f_m\}$ are the parameters of the similarity layer (303) and C 0 are the parameters of the matrix generation layer (304).

GMI 203 iteratively determines a probability of a semantic label for each pixel such that an energy function including a combination of the unary energy and the pairwise energy is minimized. The final output at each pixel is a K-dimensional class prediction score vector 307 where K is the number of classes. Let $y_i^* = [y_{i1}^*, y_{iK}^*]$ be the final output at $i^{th}$ pixel. Then the semantic label of $i^{th}$ pixel is given by $\text{argmax}_k y_{ik}^*$ 308.

Figure 3B:
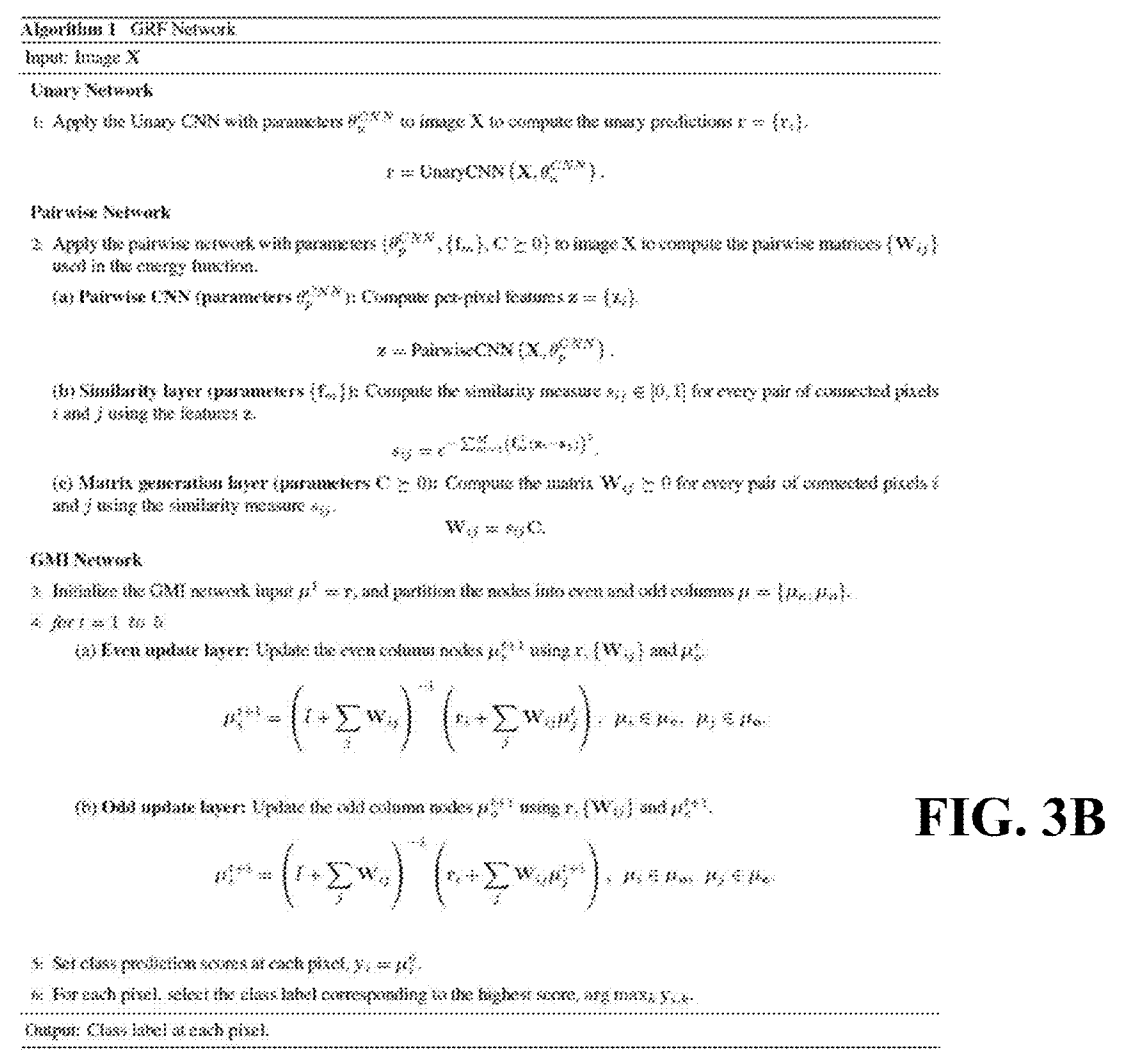

FIG. 3B shows a pseudo code for implementation of the GRF Network according to one embodiment of the invention.

Figure 4A:
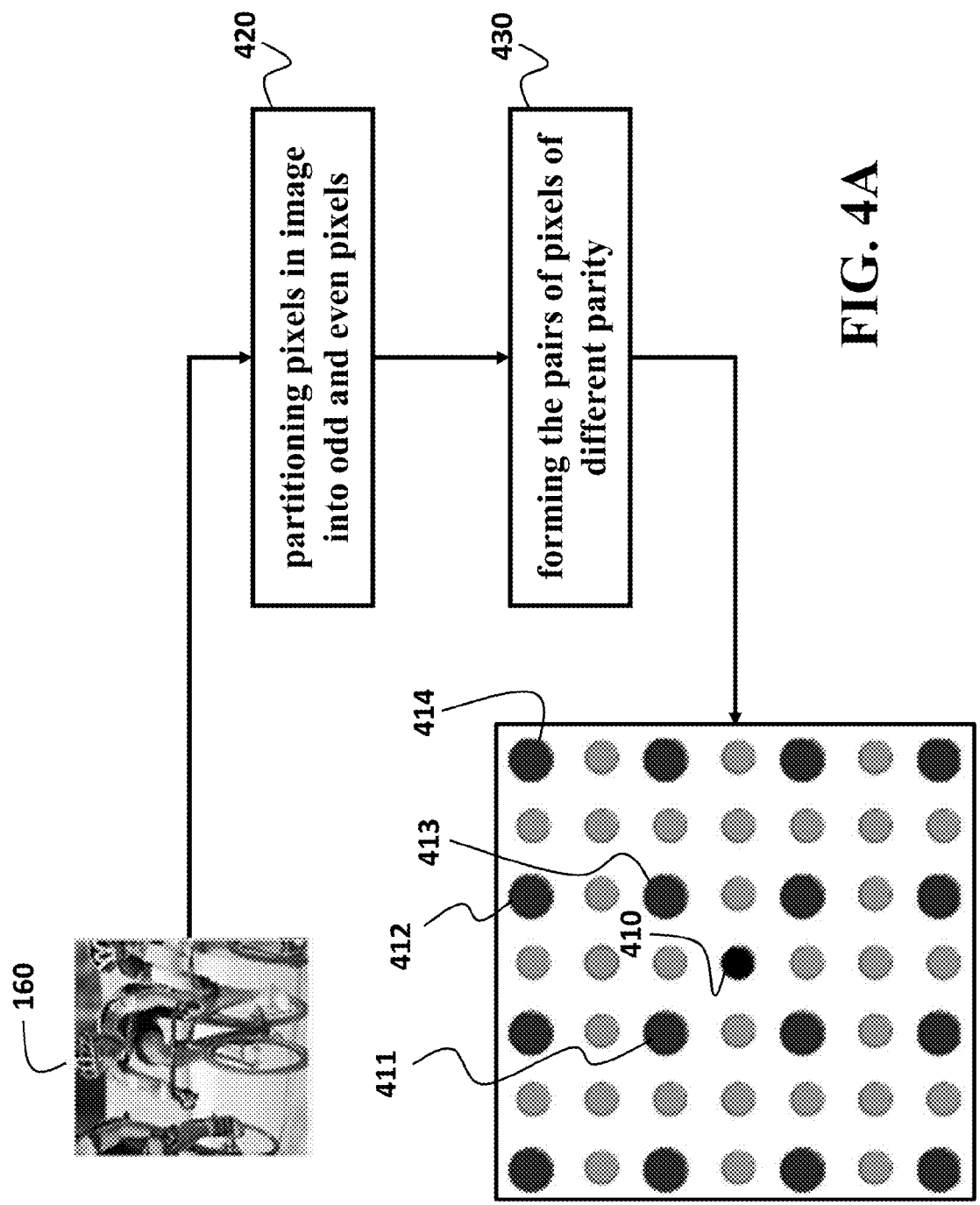
FIG. 4A is a block diagram of a method for forming pairs of the pixels for determining pair wise energy according to one embodiment of the invention.

FIG. 4A shows a block diagram of a method for forming pairs of the pixels of the image 160 for determining pairwise energy according to one embodiment of the invention. This embodiment is based on understanding that determining the pairwise energy for all possible pairs of the pixels in the image 160 slows the computations due to the large number of variables. While using parallel updates for all the pixels simultaneously seems to be a reasonable alternative, convergence of parallel updates is guaranteed only under limited conditions.

To address this problem, the embodiment uses a bipartite graph structure, which allows us to update half of the variables in parallel in each step, and still guarantees convergence without the diagonal dominance constraint. For example, the embodiment partitions 420 the pixels in the image 160 into an odd pixel or an even pixel based a parity of an index of a column or a row of the pixel and forms 430 the pairs of pixels such that in each pair of the pixels the first pixel is the odd pixel and the second pixel is the even pixel. For example, the pixel 410 is paired only with pixels in a 7×7 spatial neighborhood illustrated with a bigger black circle, such as the pixels 411, 412, 413, and 414.

In some implementations, the graphical model has a node for each pixel, and each node represents a vector of K variables. In order to update the $i^{th}$ node using Equation 2, the embodiment keeps all the other nodes connected to the $i^{th}$ node (i.e., all the nodes with non-zero $W_{ij}$) fixed. Partitioning the image into odd and even columns (or odd and even rows) and avoid edges within the partitions allows updating all the odd columns (or rows) in parallel using Equation (2) while keeping the even columns (or rows) fixed and vice versa. This alternating minimization can be optimally solved to converge to the global optimum.

Figure 4B:
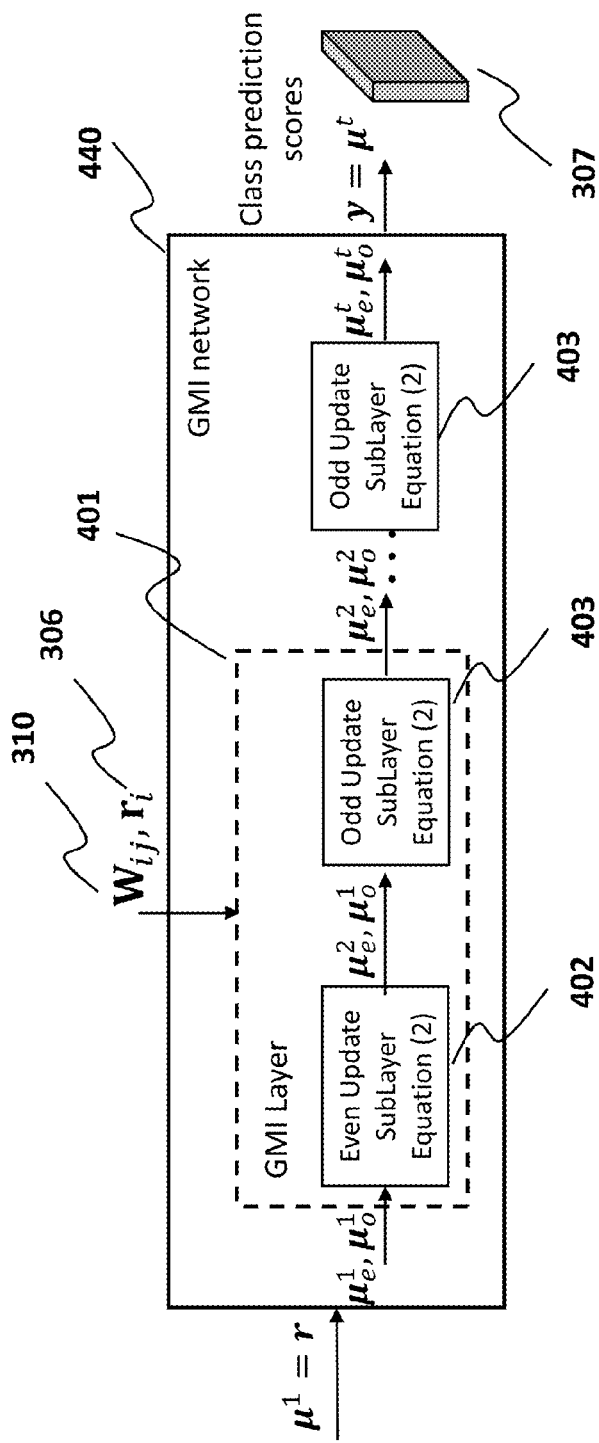
FIG. 4B is a block diagram of the network utilizing the bipartite graph structure of FIG. 4A according to some embodiments of the invention.

FIG. 4B shows a block diagram of GMI network 440 utilizing the bipartite graph structure of FIG. 4A according to some embodiments of the invention. The GMI network 440 performs a fixed number of Gaussian mean field updates using the outputs of unary and pairwise networks. The input to the network is initialized using the unary output, $\mu^1 = r = |r_i|$.

The GMI network 440 includes several GMI layers 401 combined sequentially where each layer has two sub-layers: an even update sublayer 402 followed or preceded by an odd update layer 403. The even update sublayers 402 takes the output of previous layer as input, and updates the even pixel nodes using Equation (2) while keeping odd pixel nodes fixed. Similarly, the odd update sublayer takes the output of even update sublayer as input and updates the odd pixel nodes using Equation (2) while keeping even pixel nodes fixed. The order of the odd and even update sublayers can be revered.

Due to the bipartite graph structure, the update performed by each of the above sublayers can be an optimal update. Hence, each layer of our GMI network is guaranteed to generate an output that is closer to the MAP solution compared to its input (unless the input itself is the MAP solution, in which case the output is equal to the input).

Training

Because the GRF network 114 includes interconnected subnetworks, the various subnetworks of the GRF network 114 can be jointly trained. For example, the combination of the unary, the pairwise and the GMI networks of FIG. 3A can be trained in an end-to-end fashion. One embodiment uses a fixed number of layers in the GMI network. Because of finite number of layers, the output of the GRF network potentially can be suboptimal. However, because the embodiment trains the entire GRF network discriminatively in an end-to-end fashion, the unary and pairwise networks learns to generate appropriate unary $r_i$ and pairwise $W_{ij}$ energy parameters such that the output after a fixed number of mean field updates approach optimal solution.

Figure 5:
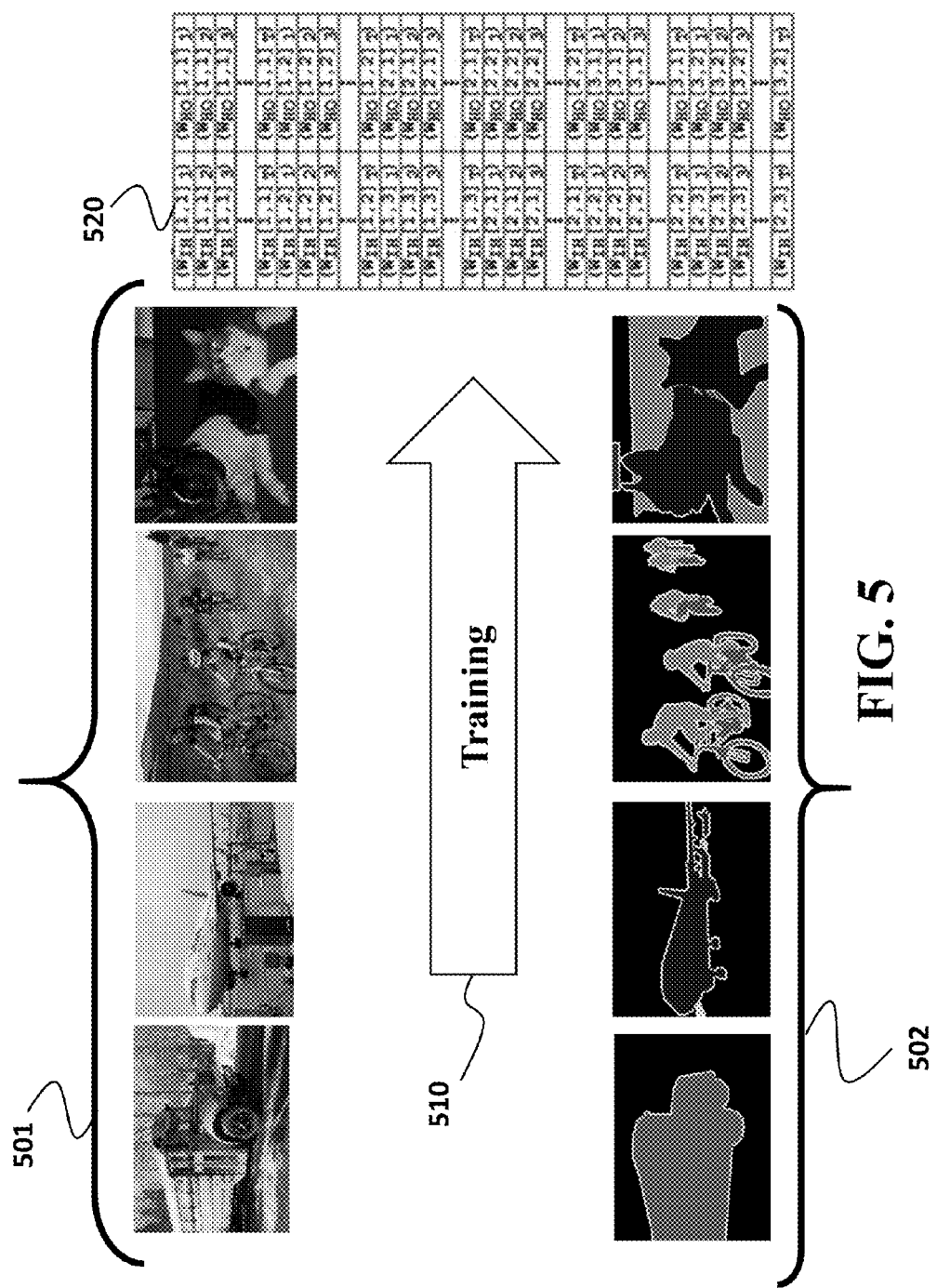
FIG. 5 is a schematic of a training method used by some embodiments of the invention.

FIG. 5 shows a schematic of the training used by some embodiments of the invention. The training 510 uses a training set of pairs of images 501 and corresponding semantically segmented images 502 to produce the parameters 520 of the GRF network. In general, training an artificial-neural-network comprises applying a training algorithm, sometimes referred to as a "learning" algorithm, to an artificial-neural-network in view of a training set. A training set may include one or more sets of inputs and one or more sets of outputs with each set of inputs corresponding to a set of outputs. A set of outputs in a training set comprises a set of outputs that are desired for the artificial-neural-network to generate when the corresponding set of inputs is inputted to the artificial-neural-network and the artificial-neural-network is then operated in a feed-forward manner. Training the neural network involves computing the parameters, e.g., weight values associated with the connections in the artificial-neural-network. For example, the parameters of the GRF network can include unary network parameters $\theta_u = \theta_u^{CNN}$ and the pairwise network parameters $\theta_p = \{\theta_p^{CNN}, \{f_m\}, C \geq 0\}$.

Figure 6:
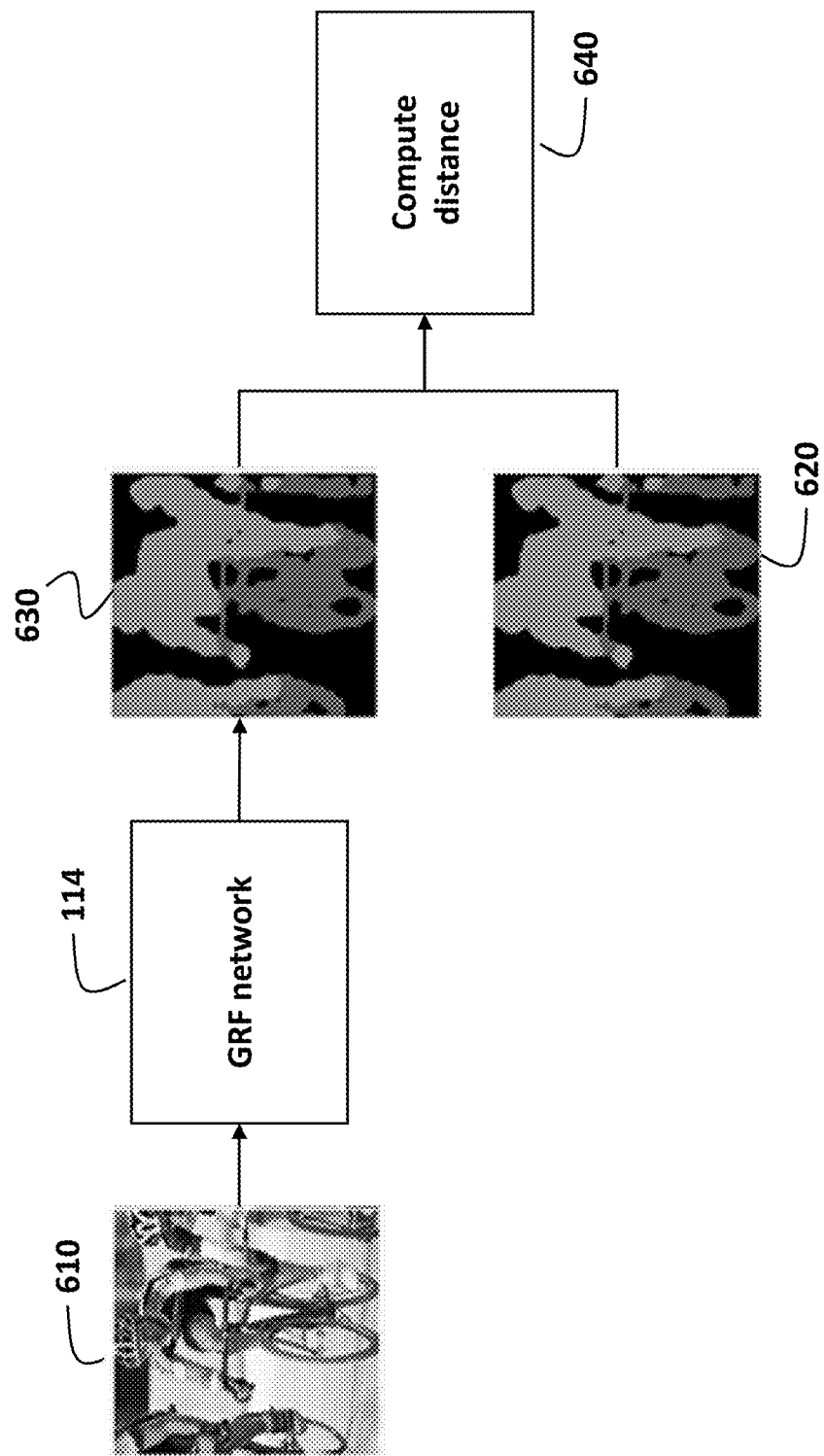
FIG. 6 is a block diagram of the training method used by some embodiments of the invention.

FIG. 6 shows a block diagram of the training method 510 used by some embodiments of the invention. The method processes an image 610 from the set 501 with the GRF network 114 to produce the semantically segmented image 630 and compares the semantically segmented image 630 with the corresponding semantically segmented image 630 from the set 502 to produce a distance 640 between the two semantically segmented images. For example, one embodiment determines the following loss function at each pixel $$L(y_i^*, l_i) = -\min(0, y_{il_i}^* - \max_{k \neq l_i} y_{ik}^* - T) \quad (6)$$

where $l_i$ is the true class label as the distance 640. This loss function basically encourages the output associated with the true class to be greater than the output associated with all the other classes by a margin T.

To that end, the embodiment trains the GRF network 114 discriminatively by minimizing the loss function. For example, the training is performed using a backpropagation to compute the gradient of the network parameters. The training can include a constrained optimization due to the symmetry and positive semi definiteness constraints on the parameter C. One embodiment converts the constrained optimization into an unconstrained optimization by parametrizing C as $C = RR^T$, where R is a lower triangular matrix, and use stochastic gradient descent for the optimization.

Figure 7:
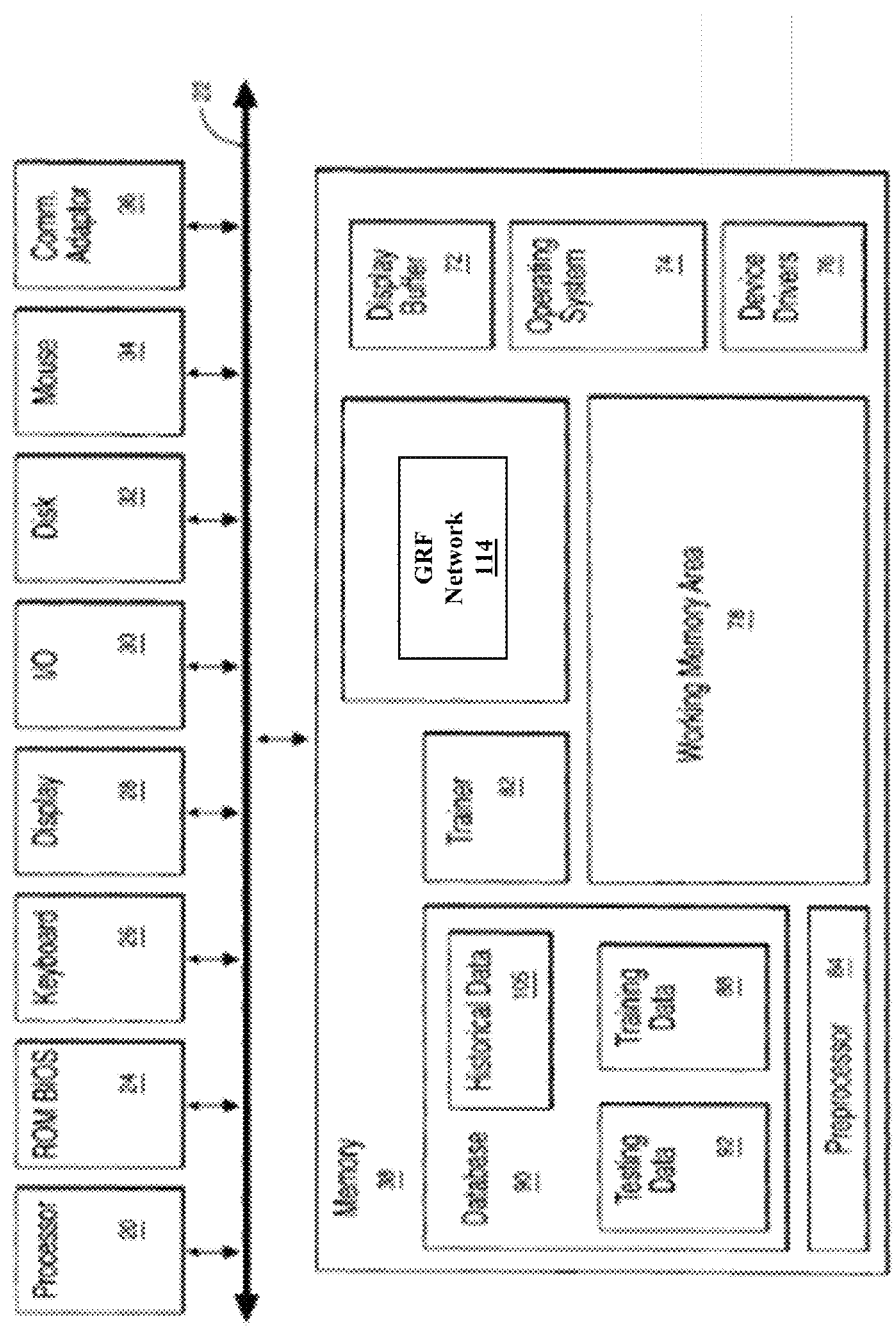
FIG. 7 is a block diagram of a training system according to one embodiment of the invention.

FIG. 7 shows a block diagram of a training system according to one embodiment of the invention. The training system includes a processor connected by a bus 22 to a read only memory (ROM) 24 and a memory 38. The training system can also include are a display 28 to present information to the user, and a plurality of input devices including a keyboard 26, mouse 34 and other devices that may be attached via input/output port 30. Other input devices such as other pointing devices or voice sensors or image sensors can also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a database 90, trainer 82, the GRF 114, preprocessor 84. The database 90 can include the historical data 105, training data, testing data 92. The database may also include results from operational, training or retaining modes of using the neural network. These elements have been described in detail above.

Also shown in memory 38 is the operating system 74. Examples of operating systems include AIX, OS/2, and DOS. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 101, trainer 82, the operating system 74 and other functions. The working memory area 78 may be partitioned amongst the elements and within an element. The working memory area 78 may be utilized for communication, buffering, temporary storage, or storage of data while a program is running The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A computer-implemented method for semantic segmentation of an image, comprising:
   determining unary energy of each pixel in an image using a first subnetwork;
   determining pairwise energy of at least some pairs of pixels of the image using a second subnetwork;
   determining, using a third subnetwork, an inference on a Gaussian random field (GRF) minimizing an energy function including a combination of the unary energy and the pairwise energy to produce a GRF inference defining probabilities of semantic labels for each pixel in the image; and
   converting the image into a semantically segmented image by assigning to a pixel in the semantically segmented image a semantic label having the highest probability for a corresponding pixel in the image among the probabilities determined by the third subnetwork, wherein the first subnetwork, the second subnetwork, and the third subnetwork are parts of a neural network, and wherein steps of the method are performed by a processor.

2. The method of claim 1, further comprising:
   rendering the semantically segmented image in a non-transitory computer readable memory.

3. The method of claim 1, wherein the third subnetwork determines GRF inference by emulating an operation of a Gaussian mean field (GMI) inference, such that each layer of the third subnetwork recursively determines a mean field inference update to minimize an energy function including a combination of the unary energy and the pairwise energy.

4. The method of claim 1, wherein, for each pixel in the image, the first subnetwork receives as an input a subset of pixels neighboring the pixel in the image and produces unary energy parameters of the pixel, wherein the unary energy is a function of the unary energy parameters of each pixel in the image and probabilities of each pixel in the image belonging to each possible semantic label.

5. The method of claim 4, further comprising:
   applying a series of linear filters performing convolutional operation to inputs to each layer of the first subnetwork; and
   applying, at some layers of the first subnetwork, a non-linear function for outputs of each linear filter.

6. The method of claim 5, wherein the unary energy function is a quadratic function $\|y_i - r_i(X; \theta_u)\|_2^2$, wherein $r_i$ is the unary energy parameters which is computed through the first subnetwork, $\theta_u$ is parameters of the linear filters, y is the probabilities of the semantic labels, i is an index of the pixel.

7. The method of claim 4, wherein the subset of pixels is a rectangular patch centered on the pixel in the image.

8. The method of claim 1, wherein the determining pairwise energy for a pair of pixels in the image comprises:
   determining a similarity measure between the pixels of the pair in the image;
   determining a covariance matrix based on the similarity measure; and
   determining the pairwise energy as a function of the covariance matrix.

9. The method of claim 8, wherein the determining the similarity measure comprises:
   processing with the second subnetwork a first subset of pixels neighboring a first pixel i of the pair to produce features $z_i$ of the first pixel;
   processing with the second subnetwork a second subset of pixels neighboring a second pixel j of the pair to produce features $z_j$ of the second pixel; and
   determining a function of a difference between the first and the second features to produce the similarity measure $s_{ij}$.

10. The method of claim 9, further comprising:
    partitioning the pixels in the image into an odd pixel or an even pixel based a parity of an index of a column or a row of the pixel in the image; and
    forming the pairs of pixels such that in each pair of the pixels the first pixel is the odd pixel and the second pixel is the even pixel.

11. The method of claim 1, wherein the first, the second, and the third subnetworks are jointly trained.

12. The method of claim 1, wherein the first, the second, and the third subnetworks are jointly trained to minimize a loss function of a set of training images and a corresponding set of training semantic labels.

13. A system for semantic segmentation of an image, comprising:
    at least one non-transitory computer readable memory to store the image and a semantically segmented image; and
    a processor to perform a semantic segmentation of the image using a Gaussian random field (GRF) network to produce the semantically segmented image, wherein the GRF network is a neural network including
       a first subnetwork for determining a unary energy of each pixel in an image;
       a second subnetwork for determining pairwise energy of at least some pairs of pixels of the image; and
       a third subnetwork for determining an inference on a Gaussian random field (GRF) minimizing an energy function including a combination of the unary energy and the pairwise energy to produce a GRF inference defining probabilities of semantic labels for each pixel in the image;
    wherein the processor converts the image into a semantically segmented image by assigning to a pixel in the semantically segmented image a semantic label having the highest probability for a corresponding pixel in the image among the probabilities determined by the third subnetwork.

14. The system of claim 13, wherein the third subnetwork determines GRF inference by emulating an operation of a Gaussian mean field (GMI) inference, such that each layer of the third subnetwork recursively determines a mean field inference update to minimize an energy function including a combination of the unary energy and the pairwise energy.

15. The system of claim 13, wherein, for each pixel in the image, the first subnetwork receives as an input a subset of pixels neighboring the pixel in the image and produces unary energy parameters of the pixel, wherein the unary energy is a function of the unary energy parameters of each pixel in the image and probabilities of each pixel in the image belonging to each possible semantic label.

16. The system of claim 13, wherein the second subnetwork
- determines a similarity measure between the pixels of the pair in the image;
- determines a covariance matrix based on the similarity measure; and
- determines the pairwise energy as a function of the covariance matrix.

17. The system of claim 16, wherein the second subnetwork determines the similarity measure by
- processing a first subset of pixels neighboring a first pixel i of the pair to produce features $z_i$ of the first pixel;
- processing a second subset of pixels neighboring a second pixel j of the pair to produce features $z_j$ of the second pixel; and
- determining a function of a difference between the first and the second features to produce the similarity measure $s_{ij}$.

18. The system of claim 16, wherein the processor
- partitions the pixels in the image into an odd pixel or an even pixel based a parity of an index of a column or a row of the pixel in the image; and
- forms the pairs of pixels such that in each pair of the pixels the first pixel is the odd pixel and the second pixel is the even pixel.

19. The system of claim 13, wherein the first, the second, and the third subnetworks are jointly trained.

20. A non-transitory computer-readable medium with instructions stored thereon, that when executed by a processor, perform the steps comprising:
- determining unary energy of each pixel in an image using a first subnetwork;
- determining pairwise energy of at least some pairs of pixels of the image using a second subnetwork;
- determining, using a third subnetwork, an inference on a Gaussian random field (GRF) minimizing an energy function including a combination of the unary energy and the pairwise energy to produce a GRF inference defining probabilities of semantic labels for each pixel in the image; and
- converting the image into a semantically segmented image by assigning to a pixel in the semantically segmented image a semantic label having the highest probability for a corresponding pixel in the image among the probabilities determined by the third subnetwork, wherein the first subnetwork, the second subnetwork, and the third subnetwork are jointly trained as parts of a neural network.

* * * * *